United States Patent [19]

Jalbert et al.

[11] Patent Number: 5,001,178

[45] Date of Patent: Mar. 19, 1991

[54] THERMOPLASTIC MOLDING COMPOSITIONS

[75] Inventors: Ronald L. Jalbert; Keith E. Cox, both of Parkersburg, W. Va.

[73] Assignee: General Electric Company, Parkersburg, W. Va.

[21] Appl. No.: 318,888

[22] Filed: Mar. 6, 1989

[51] Int. Cl.$^5$ .......................... C08K 5/06; C08K 5/527
[52] U.S. Cl. ................................... 524/109; 524/120; 525/65
[58] Field of Search .................. 524/109, 120; 525/65

[56] References Cited

U.S. PATENT DOCUMENTS

| | | | |
|---|---|---|---|
| 2,890,194 | 6/1959 | Phillips et al. | 528/297 |
| 2,890,196 | 6/1959 | Phillips et al. | 528/297 |
| 2,890,197 | 6/1959 | Phillips et al. | 528/297 |
| 2,890,209 | 6/1959 | Phillips et al. | 528/301 |
| 2,917,469 | 12/1959 | Phillips et al. | 528/361 |
| 3,027,357 | 3/1962 | Stickle, Jr. | 525/374 |
| 3,496,250 | 2/1970 | Czerwinski | 525/65 |
| 4,013,613 | 3/1977 | Abolins et al. | 525/444 |
| 4,195,134 | 3/1980 | Coleman | 525/65 |
| 4,259,458 | 3/1981 | Robeson | 525/68 |
| 4,286,075 | 8/1981 | Robeson | 525/438 |
| 4,292,233 | 9/1981 | Binsack et al. | 525/69 |
| 4,302,382 | 11/1981 | Spanswick | 524/109 |
| 4,348,500 | 9/1982 | Robeson | 525/65 |
| 4,417,026 | 11/1983 | Lindner et al. | 525/64 |
| 4,482,671 | 11/1984 | Woo et al. | 525/65 |
| 4,525,498 | 6/1985 | Atkins et al. | 524/109 |
| 4,548,985 | 10/1985 | Yazaki et al. | 525/65 |
| 4,814,103 | 3/1989 | Potter et al. | 524/109 |
| 4,814,366 | 3/1989 | Hirahara et al. | 524/109 |
| 4,855,355 | 8/1989 | Hirai et al. | 525/65 |

FOREIGN PATENT DOCUMENTS 2171505A 9/1986 United Kingdom .

Primary Examiner—Kriellion Morgan
Attorney, Agent, or Firm—Lowe, Price, LeBlanc, Becker & Shur

[57] ABSTRACT

Thermoplastic blend compositions comprise a crystalline polyalkylene terephthalate, a styrenic polymer component, and a diepoxide. The styrenic polymer component comprises a rigid portion formed from at least one monomer selected from the group consisting of styrene, halogen-substituted styrene, alpha-methyl styrene and para-methyl styrene, and at least one additional ethylenically unsaturated monomer, and a rubber portion including polybutadiene.

4 Claims, 1 Drawing Sheet

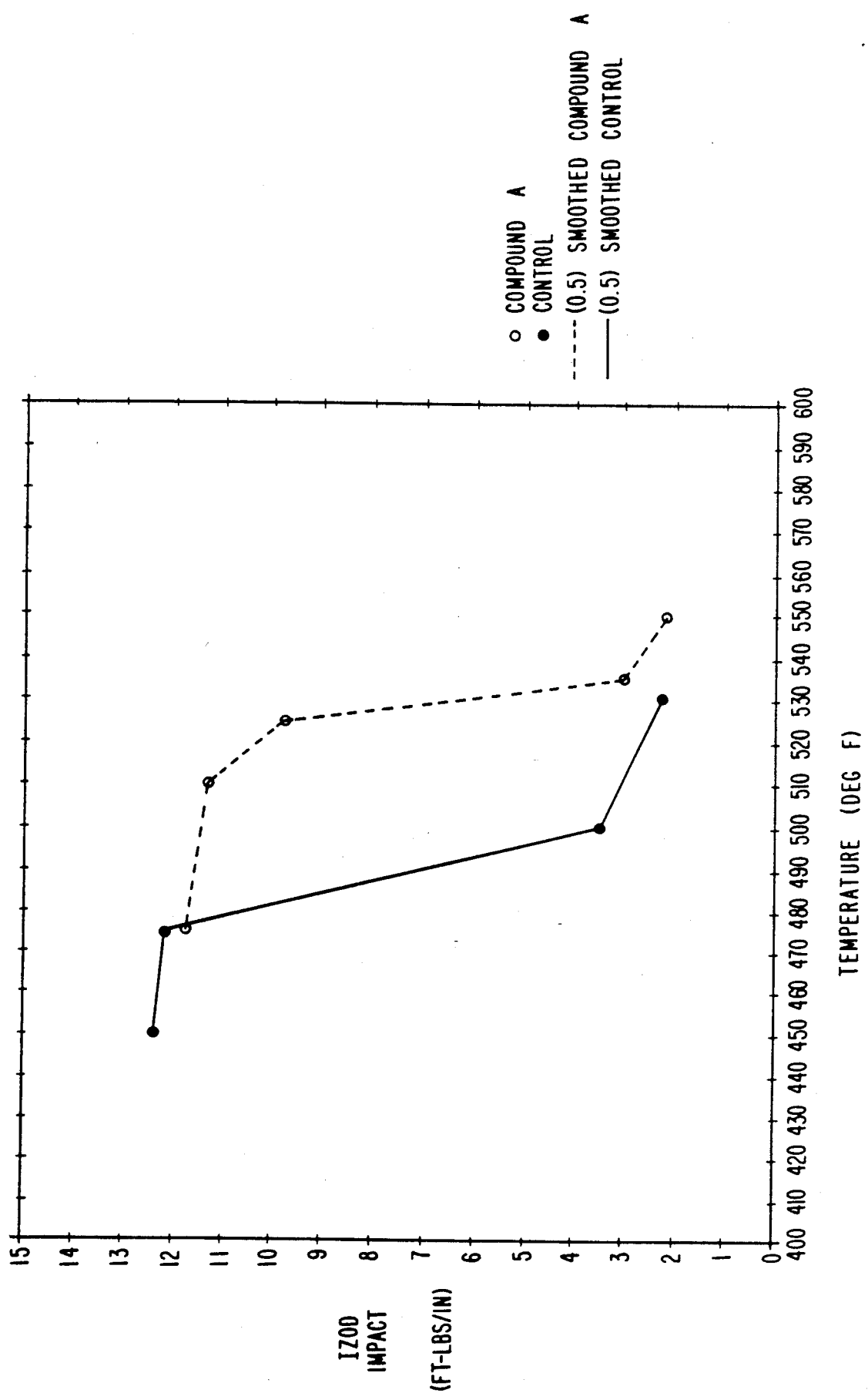

THERMOPLASTIC MOLDING COMPOSITIONS

FIELD OF THE INVENTION

This invention relates to improved, thermoplastic molding compositions comprising a thermoplastic polyester, such as polybutylene terephthalate (PBT); a styrene polymer component containing a rigid portion formed of two or more monomers, such as styrene and acrylonitrile, grafted onto a rubbery portion such as polybutadiene; and optionally, a rigid copolymer, formed for example of styrene or alpha-methyl styrene and acrylonitrile; and a diepoxide additive which enhances the high temperature processing stability of the polymer blend as measured by the Izod impact strength.

BACKGROUND OF THE INVENTION

Bayer U.S. Pat. Nos. 4,292,233 and 4,417,026 both disclose the combination of a high rubber graft ABS as an impact modifier for PBT.

Societe Chimique des Charbonnages (France) GB 2,171,705 discloses the combination of 3 to 50% PBT with at least one vinyl aromatic monomer and at least one unsaturated nitrile grafted onto a rubber and further blended with a copolymer comprising at least one unsaturated nitrile and at least one vinyl aromatic monomer.

Phillips et al U.S. Pat. No. 2,890,209 describes a family of diepoxides which are useful in maintaining impact performance at high processing temperatures.

SUMMARY OF THE INVENTION

Many applications for specific thermoplastic compositions are lost when it is discovered that certain properties cannot be achieved which are critical to the commercial success of the application. A good example is an automotive application, such as instrument panels, glove box doors and other interior vehicle components. Polymeric materials have replaced metal and composite materials in virtually all such applications. Typical of the plastics used in instrument panels is grafted ABS, alone or alloyed with polycarbonate. Other compositions which are employed comprise polycarbonate, modified polyphenylene ethers, and glass-filled styrene-maleic anhydride resins.

ABS and ABS alloys generally have the best balance of properties However, chemical resistance is a recognized deficiency. Some exogenous materials, such as air freshener pads, emit a solvent which attacks the ABS based polymers and can reduce the tensile and impact strength over time. Accordingly, crystalline thermoplastic polyesters, such as PBT have been proposed on the basis that such polyesters can contribute chemical resistance to the blend.

One of the problems associated with PBT/ABS alloys is the relatively poor compounding and/or molding stability at elevated temperatures as measured by impact strength. Typical formulations lose almost 75% of their impact performance between 475° F. and 500° F. The present invention is based on the discovery that the impact strength of ABS/PBT blends can be maintained at temperatures well above 500° F. by the incorporation of small amounts of diepoxide additive. While the mechanism is not certain, it is believed that the diepoxide can relink chains of the polyester molecules, which tend to break apart at elevated temperatures, thus holding or maintaining the molecular weight within acceptable limits.

DESCRIPTION OF THE DRAWING

The single FIGURE in the drawing is a data plot comparing a composition formulated in accordance with the present invention with a control; the parameters of the data are stock temperature and Room Temperature Izod Impact Strength (Notched).

DETAILED DESCRIPTION

In its broadest sense, the present invention comprises a polymer blend composition of (a) a crystalline polyester; (b) a styrenic polymer component, and (c) a diepoxide.

Constituent A—Polyesters

Typical polyesters for use in the present compositions comprise alkylene terephthalates which are well known in the art. The polyesters are crystalline and linear. Preferably, the alkylene group comprises 4 carbon atoms Suitable alkylene terephthalates are disclosed in U.S. Pat. Nos. 4,066,627, 4,184,033, 4,069,278 and 4,593,077.

In the area of thermoplastic molding compounds, polybutylene terephthalates are very important due to their valuable technological characteristics, such as stiffness, hardness, chemical and abrasion resistance, dynamic and thermal load-bearing capacity, and ready processing ability However, a disadvantage of these molding materials is that their multiaxial (two-dimensional) impact resistance is not always sufficiently high.

Numerous proposals have been made to increase the thermoplastic polyesters by means of admixing or incorporating by means of condensation other polymers, in particular those based on modified elastomers and polyolefins See, for example, German Patents (Offenlegungsschrift) 16 94 173 and 19 28 369; German Patents (Auslegeschrift) 19 61 226 and 19 62 855; German Patents (Offenlegungsschrift) 22 48 242 23 10 034 23 406 and 23 64 318 and U.S. Pat. Nos. 3,236,914 and 3,723,574. However, these proposed measures have the disadvantage that the improvement of the impact resistance entails a considerable impairment of other properties, such as those mentioned above. Moreover, the multiaxial impact resistance is not obtained to the degree desired.

Attempts to increase the impact resistance of polybutylene terephthalates have been made by means of adding acrylonitrile-butadiene-styrene (ABS) graft polymers. See, for example, German Patents (Offenlegungsschrift) 20 35 390 and 23 48 377, Japanese Patent Applications 49-097 081 (127 689); 50-053 448 (074 743); and 50-023 449 (074 744). However, in products obtained by means of these proposals, the typical properties of polybutylene terephthalate, such as high dimensional stability under heat, hardness and stiffness, are either considerably impaired or the products which are obtained do not exhibit a sufficiently high multiaxial impact strength Constituent B—Styrenic Component The styrenic polymer component which is included in the blend compositions of the invention comprises a rigid portion and a rubber portion. The rigid portion is formed from at least two ethylenically unsaturated monomers, one of which comprises styrene and/or substituted styrene. Preferred substituted styrenes include, but are not limited to, halogen-substituted styrene, particularly wherein the halogen is substituted on the aromatic ring, alpha-methyl styrene and para-methyl styrene. The other ethylenically unsaturated monomer which is used in forming the rigid portion may be selected from acrylonitrile, substituted acrylonitriles, acrylates, alkyl substituted acrylates, methacrylates, alkyl substituted methacrylates, and ethylenically unsaturated carboxylic acids, diacids, dianhydrides, acid esters, diacid esters, amides, imides and alkyl and aryl substituted imides. Preferably, the second monomer which is used to form the rigid portion is selected from the group consisting of acrylonitrile, methacrylonitrile, alkyl methacrylates, maleic anhydride, maleimide, alkyl maleimides and aryl maleimides, and mixtures thereof. It is further preferred that the rigid portion is formed from about 60 to about 95 weight percent, and more preferably 60 to 80 weight percent, of the styrene and/or substituted styrene monomers, and from about 5 to about 40 weight percent, and more preferably 20 to 40 weight percent, of the second monomer.

The rubber portion may be formed from polymers or copolymers of one or more conjugated dienes, copolymers of conjugated dienes and non-diene vinyl monomers, alkyl acrylate polymers, and copolymers of ethylenically unsaturated olefins and non-conjugated diene polymers (EPDM) rubbers. A preferred rubber portion includes polybutadiene.

The styrenic polymer component may be formed such that the rigid portion is grafted to the rubber portion. Alternatively, the rigid portion may be blended with the rubber portion. When the rigid portion is blended with the rubber portion, it is preferred that the rubber portion has been previously grafted with one or more grafting monomers Accordingly, the styrenic polymer component may be so produced by any method known in the art, for example, emulsion, bulk, mass or suspension polymerization processes. It is preferred that the styrenic polymer component contains from about 10 to 90 weight percent of the rubber portion and from about 10 to 90 weight percent of the rigid portion, based on the rubber portion and the rigid portion. More preferably, the styrenic polymer component comprises from about 40 to about 80 weight percent of the rubber portion and from about 20 to about 60 weight percent of the rigid portion, based on the rubber portion and the rigid portion.

Component C—Diepoxides

Various diepoxides which are useful in the present invention are described in U.S. Pat. No. 2,890,209. The diepoxides may be prepared by the catalytic esterification of 3,4-epoxycyclohexylmethyl 3,4-epoxycyclohexanecarboxylates and have the general formula

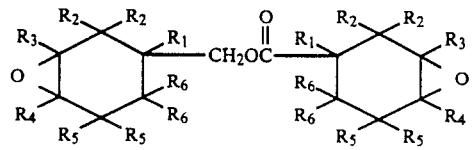

wherein $R_1$, $R_2$, $R_3$, $R_4$, $R_5$ and $R_6$ represent members selected from the group consisting of hydrogen and alkyl groups. More particularly, $R_1$ through $R_6$ represent members selected from the group consisting of hydrogen and lower alkyl groups containing from one to four carbon atoms. When any of $R_1$ through $R_6$ represent alkyl groups and particularly the lower alkyl groups, a preferred class of diepoxides are those wherein the total number of carbon atoms contained in said alkyl groups does not exceed twelve. A particularly preferred class of compounds represented by the general formula above are those wherein $R_1$ through $R_6$ represent members selected from the group consisting of hydrogen and methyl groups. Polymers and particularly the homopolymers made from diepoxide monomers and mixtures thereof having not more than 3 alkyl substituents per carbocyclic ring are preferred.

The diepoxides represented by the general formula above can be conveniently prepared by reacting a selected 3-cyclohexenylmethyl 3-cyclohexenecarboxylate with peracetic acid. The 3-cyclohexenylmethyl 3-cyclohexenecarboxylates, in turn, are readily prepared by reacting a selected 3-cyclohexenecarboxalkdehyde in the presence of an aluminum alkoxide catalyst dissolved in an inert solvent, such as benzene, at a temperature in the range of 0° C. to 110° C.

The compositions of the invention preferably contain the diepoxide constituent in an amount sufficient to enhance the high temperature processing stability of the blends as measured by the Izod impact strength. In preferred embodiments, the compositions contain from about 0.01 to about 5 weight percent of the diepoxide, from about 20 to about 99 weight percent of the polyalkylene terephthalate, and a balance of the styrenic polymer component.

The present invention will be more fully understood in view of the following examples

EXAMPLE 1

A polymer blend composition according to the invention was prepared by mixing the following components in a Brablender mixer (all in parts by weight)

| | |
|---|---|
| ABS | 55 |
| PBT | 45 |
| Stabilizer | 0.5 |

The ABS was an emulsion-formed acrylonitrile, butadiene, styrene graft polymer containing (as charged) 18% acrylonitrile, 30% butadiene and 52% styrene.

The PBT was a commercial grade of polybutylene terephthalate (Valox 315 made by General Electric Company). The stabilizer comprised a bis(2,6-di-t-butylphenyl) pentaerythritol disphosphite (Ultranox 626 supplied by GE Specialty Chemicals Inc.). Test plaques were compression molded from the blend as described.

EXAMPLE 2

Example 1 was repeated using the same ingredients except that 0.25 pbw of a diepoxide was added to the mixture. The diepoxide was a 3,4-epoxycyclohexylmethyl 3,4-epoxycyclohexylcarboxylate.

The room temperature Izod Impact data was obtained for test plaques of the compositions of Examples 1 and 2 for a range of molding temperatures (⅛" sample, fit-lb/in). The data is set forth in Table I and is graphically represented in the FIGURE.

TABLE I

| Molding Temperature (°F.) | Example 1 | Example 2 |
|---|---|---|
| 450 | 12.4 | — |
| 475 | 12.2 | 11.8 |
| 500 | 3.5 | — |
| 510 | — | 11.4 |
| 525 | — | 9.8 |
| 530 | 2.3 | — |
| 535 | — | 3.0 |

TABLE I-continued

| Molding Temperature (°F.) | Example 1 | Example 2 |
| --- | --- | --- |
| 550 | — | 2.2 |

EXAMPLES 3 and 4

Additional formulations were prepared wherein the styrenic polymer component comprised a high rubber graft mixed with a rigid styrene-acrylonitrile-alpha-methylstyrene copolymer. These compositions also included an additional portion of a high rubber graft.

The compositions had the following formulae (parts by weight):

| Composition | Example 3 | Example 4 |
| --- | --- | --- |
| PBT | 35 | 35 |
| Styrenic polymer A | 58.6 | — |
| Styrenic polymer B | — | 58.6 |
| High rubber graft ABS | 6.4 | 8.2 |
| Diepoxide | 0.25 | 0.25 |
| Antioxidant | 0.25 | 0.25 |
| Stabilizer | 0.25 | 0.25 |

Notes: The PBT and stabilizer are the same as were employed in Examples 1 and 2; Styrenic polymer A comprised 77 weight percent of the rigid copolymer and 23 weight percent of a first high rubber graft; Styrenic polymer B comprised 77 weight percent of the rigid copolymer and 23 weight percent of a second high rubber graft; and the Antioxidant was Mark 5177 supplied by Argus Chemical Co.

Test specimens of the compositions were molded at 500° F. and thoroughly tested for a broad range of physical properties. A control ABS (Cycolac X15 supplied by GE Chemicals comprising 80 weight percent of styrenic polymer A and 20 weight percent of an additional ABS graft) was used in Comparative Example 5.

TABLE II

| Example | 3 | 4 | 5 |
| --- | --- | --- | --- |
| Chemical Resistance Rating, Honey Kiss | | | |
| 0.5% Strain | 5 | 5 | 5 |
| 1.0% Strain | 5 | 5 | 1 |
| 1.5% Strain | 5 | 5 | 1 |
| Melt Viscosity, 500° F., (Pa-sec) | | | |
| 100 sec-1 | 886.9 | 1021.7 | 1090.0 |
| 500 sec-1 | 385.7 | 419.8 | 426.3 |
| 1000 sec-1 | 269.4 | 286.2 | 265.4 |
| Melt Flow Rate, 240° C./10 Kg, (g/10 min) | | | |
| | 15.293 | 13.902 | 7.484 |
| Dynatup Impact Strength, 73° F., (kg-cm) | | | |
| Fail Point Average | 473.86 | 500.83 | 203.46 |
| Fail Point St. Dev. | 12.17 | 14.52 | 129.60 |
| Dynatup Impact Strength, −20° F., (kg-cm) | | | |
| Fail Point Average | 98.48 | 188.24 | 20.47 |
| Fail Point St. Dev. | 31.67 | 140.94 | 7.19 |
| Notched Izod Impact, 0.125", (kg-cm/cm) | | | |
| 73° F. | 1.58 | 37.5 | 22.8 |
| 0° F. | 7.1 | 7.1 | 7.6 |
| −40° F. | 3.3 | 3.8 | 3.8 |
| Notched Izod Impact, 0.250, (kg-cm/cm) | | | |
| RT | 5.4 | 6.0 | 18.5 |
| Mold Shrinkage, (%) | 0.72 | 0.70 | 0.65 |
| HDT, 0.250", (°C.) | | | |
| 66 psi | 108 | 99 | 109 |
| 264 psi | 86 | 88 | 89 |
| HDT, 0.125", (°C.) | | | |
| 66 psi | 106 | 107 | 107 |
| 264 psi | 86 | 88 | 89 |
| Gloss | | | |
| 20° | 75 | 86 | 77 |
| 60° | 94 | 99 | 93 |
| Rockwell Hardness, R-scale | | | |
| | 107 | 110 | 103 |
| Tensile Properties, 73° F., 0.125", 0.2 in./min, (kg/cm²) | | | |
| Strength | 449 | 479 | 461 |
| Modulus | 21,550 | 23,240 | 22,890 |
| Elongation (%) | 30 | 30 | 33 |
| Flexural Properties, 73° F., 0.125", 0.05 in./min, (kg/cm²) | | | |
| Strength | 710 | 765 | 789 |
| Modulus (xE5) | 21,700 | 23,800 | 24,500 |

The preceding examples are set forth to illustrate specific embodiments of the invention and are not intended to limit the scope of the compositions of the present invention. Additional embodiments and advantages within the scope of the claimed invention will be apparent to one of ordinary skill in the art.

What is claimed is:

1. A thermoplastic composition consisting essentially of:

(A) from about 20 to about 99 weight percent of crystalline polyalkylene terephthalate;

(B) from about 0.01 to about 5 weight percent of a diepoxide having the formula:

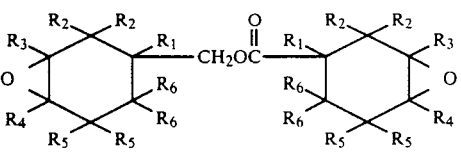

wherein $R_1$, $R_2$, $R_3$, $R_4$, $R_5$ and $R_6$ represent members selected from the group consisting of hydrogen and alkyl groups containing 1 to 4 carbon atoms; and (C) a balance of a polymer component comprising a rigid portion and a rubber portion, the rigid portion being formed from at least one monomer selected from the group consisting of styrene, halogen-substituted styrene, alpha-methylstyrene and para-methylstyrene, and at least one monomer selected from the group consisting of acrylonitrile, methacrylonitrile, alkyl methacrylate, maleic anhydride, maleimide, alkyl maleimide and aryl maleimide, and the rubber portion including polybutadiene.

2. A thermoplastic composition as defined by claim 1, wherein the polymer component comprises the rigid portion blended with the rubber portion, and wherein the rubber portion includes at least one of said monomers grafted thereto.

3. A thermoplastic composition as defined by claim 1, wherein the polymer component comprises the rigid portion grafted to the rubber portion.

4. A thermoplastic composition consisting essentially of:

(A) from about 20 to about 99 weight percent of crystalline polyalkylene terephthalate;

(B) from about 0.01 to about 5 weight percent of a diepoxide having the formula:

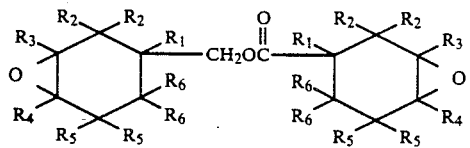

wherein $R_1$, $R_2$, $R_3$, $R_4$, $R_5$ and $R_6$ represent members selected from the group consisting of hydrogen and alkyl groups containing 1 to 4 carbon atoms;

(C) a stabilizer comprising bis(2,6-di-tert-butylphenyl) pentaerythritol diphosphite; and (D) a balance of a polymer component comprising a rigid portion and a rubber portion, the rigid portion being formed from at least one monomer selected from the group consisting of styrene, halogen-substituted styrene, alpha-methylstyrene and para-methylstyrene, and at least one monomer selected from the group consisting of acrylonitrile, methacrylonitrile, alkyl methacrylate, maleic anhydride, maleimide, alkyl maleimide and aryl maleimide, and the rubber portion including polybutadiene.

* * * * *